(12) United States Patent
Payette et al.

(10) Patent No.: US 12,482,049 B2
(45) Date of Patent: Nov. 25, 2025

(54) SYSTEM AND METHOD FOR DYNAMICALLY GENERATING COLLECTION ROUTES BASED ON PREDICTED ACCUMULATION OF INDUSTRIAL WASTE AND RECYCLABLES

(71) Applicant: RPM Environnement LTEE, Blainville (CA)

(72) Inventors: Dominic Payette, Blainville (CA); Basil Yunan, Montreal (CA); Pierre Gendron, Blainville (CA); Cedrik Dumoulin, Blainville (CA); Alexandre Ouellet, Laval (CA); David Larivée, Laval (CA); Pascalin Ngoko, Laval (CA)

(73) Assignee: OSCAL.AI Inc., Montreal (CA)

( * ) Notice: Subject to any disclaimer, the term of this patent is extended or adjusted under 35 U.S.C. 154(b) by 929 days.

(21) Appl. No.: 17/671,708

(22) Filed: Feb. 15, 2022

(65) Prior Publication Data

US 2023/0260067 A1 Aug. 17, 2023

(51) Int. Cl.
*G06Q 50/26* (2024.01)
(52) U.S. Cl.
CPC .................. *G06Q 50/26* (2013.01)
(58) Field of Classification Search
CPC ........ G06Q 10/04; G06Q 10/30; G06Q 50/26; G06Q 10/08; G06Q 10/047
See application file for complete search history.

(56) References Cited

U.S. PATENT DOCUMENTS

| 9,574,892 B2 | 2/2017 | Rodoni |
| 9,930,429 B2 | 3/2018 | Kekalainen |

(Continued)

FOREIGN PATENT DOCUMENTS

| CN | 110084396 A | * 8/2019 |
| CN | 209796437 U | * 12/2019 |

(Continued)

OTHER PUBLICATIONS

Shabir Ahmad, Optimal Route Recommendation for Waste Carrier Vehicles for Efficient Waste Collection: A Step Forward Towards Sustainable Cities. May 8, 2020. (Year: 2020).*

(Continued)

*Primary Examiner* — Maria C Santos-Diaz
(74) *Attorney, Agent, or Firm* — Occhiuti & Rohlicek LLP; Frank R. Occhiuti

(57) ABSTRACT

The system for dynamically generating collection routes predicts accumulation data indicative of the actual of industrial waste and/or recyclables accumulated at a given time at different collection sites. The system dynamically generates collection routes for dispatching vehicles to collect the waste and/or recyclables before they exceed a given accumulation threshold. The collection routes are thus generated based on collection sites which have been identified as needing collection services. The system comprises a prediction module for predicting waste accumulation, a simulation module for creating and simulating collection routes, a control module for managing and modifying the collection routes, and a user interface for displaying routes to vehicle drivers and/or dispatch operators and for receiving and processing collection site data gathered by the drivers.

29 Claims, 11 Drawing Sheets

(56) References Cited

U.S. PATENT DOCUMENTS

| | | | |
|---|---|---|---|
| 10,214,350 B2 | 2/2019 | Liu et al. | |
| 10,332,197 B2 | 6/2019 | Kekalainen et al. | |
| 2017/0109704 A1 | 4/2017 | Lettieri et al. | |
| 2019/0304236 A1* | 10/2019 | Chan | G07F 7/0609 |
| 2020/0082354 A1 | 3/2020 | Kurani | |
| 2020/0191580 A1 | 6/2020 | Christensen et al. | |
| 2021/0049559 A1 | 2/2021 | Kilburn | |
| 2022/0101280 A1* | 3/2022 | Anderson | B65F 1/14 |
| 2022/0180501 A1* | 6/2022 | Perez | G06T 7/0004 |

FOREIGN PATENT DOCUMENTS

| | | | | |
|---|---|---|---|---|
| CN | 112560576 A | * | 3/2021 | G01C 21/20 |
| KR | 20220006353 A | * | 1/2022 | |
| WO | WO-2018182858 A1 | * | 10/2018 | G06Q 10/063 |
| WO | WO-2022229788 A1 | * | 11/2022 | |

OTHER PUBLICATIONS

W. Nasar, I. A. Hameed and L. Giarré, "Smart Waste Management System as a Sustainable Social Enterprise Model, " 2021 29th Mediterranean Conference on Control and Automation (MED), Puglia, Italy, 2021, pp. 255-260 (Year: 2021).*

S. K. Nambiar and Sumam Mary Idicula, "A multi-agent vehicle routing system for garbage collection," 2013 Fifth International Conference on Advanced Computing (ICoAC), Chennai, India, 2013, pp. 72-76 (Year: 2013).*

F. Calluche-Avendaño, K. Castillo-Flores and G. Viacava-Campos, "Improving Construction Waste Management using Transportation Management and Lean Tools at a Construction and Hydrocarbons Company," 2022 8th International Conference on Information Management (ICIM), Cambridge, United Kingdom, 2022, (Year: 2022).*

Wu, Hailin, et al. "A Chance-Constrained Vehicle Routing Problem for Wet Waste Collection and Transportation Considering Carbon Emissions." International Journal of Environmental Research and Public Health, vol. 17, No. 2, Jan. 10, 2020, https://doi.org/10.3390/ijerph17020458.

* cited by examiner

| Sector Name | | | | | | | | | | Starting Weight | | |
|---|---|---|---|---|---|---|---|---|---|---|---|---|
| All ⌄ | | | | | | | | | | | | |
| Carrier Name | | | | | | | | | | | | |
| All ⌄ | | | | | | | | | | | | |
| Year, Week # | | | | | | | | | | | | |
| All ⌄ | | | | | | | | | | | | |
| | Date | Carrier Name | Sector Name | Driving Time | Max Driving Time | Weight | Min | Max | Stop | FS in route | Decision |
| | 23/12/21 | Carrier A | Sector 1 | 8,90 | 14,00 | 1192,94 | 800 | 1200 | 10 | False | Approved |
| | 20/12/21 | Carrier B | Sector 2 | 24,67 | 25,00 | 1340,41 | 1170 | 2000 | 23 | True | Approved |
| | 21/12/21 | Carrier C | Sector 2 | 11,15 | 14,00 | 190,43 | 800 | 1200 | 13 | True | Approved |
| | 24/12/21 | Carrier C | Sector 3 | 10,76 | 14,00 | 1198,60 | 800 | 1200 | 19 | False | Approved |
| | 21/12/21 | Carrier C | Sector 3 | 8,31 | 14,00 | 1199,77 | 800 | 1200 | 21 | False | Approved |
| | 22/12/21 | Carrier C | Sector 4 | 6,11 | 14,00 | 827,22 | 800 | 1200 | 18 | True | Approved |
| | 23/12/21 | Carrier D | Sector 4 | 6,91 | 14,00 | 270,72 | 780 | 2000 | 3 | False | Rejected |
| | 22/12/21 | Carrier D | Sector 5 | 8,91 | 14,00 | 371,64 | 780 | 2000 | 4 | False | Approved |
| | 24/12/21 | Carrier D | Sector 6 | 9,82 | 14,00 | 1775,52 | 780 | 2000 | 7 | False | Approved |
| | 20/12/21 | Carrier D | Sector 6 | 13,84 | 14,00 | 882,97 | 1300 | 2000 | 9 | True | Approved |
| | 23/12/21 | Carrier D | Sector 7 | 13,42 | 14,00 | 1227,65 | 1300 | 2000 | 22 | True | Approved |
| | 24/12/21 | Carrier D | Sector 7 | 13,95 | 14,00 | 930,67 | 1300 | 2000 | 17 | True | Approved |
| | 24/12/21 | Carrier D | Sector 7 | 13,97 | 14,00 | 1375,24 | 1300 | 2000 | 16 | True | Rejected |
| | 22/12/21 | Carrier C | Sector 7 | 9,89 | 14,00 | 939,79 | 800 | 2000 | 23 | True | Approved |

FIG. 5

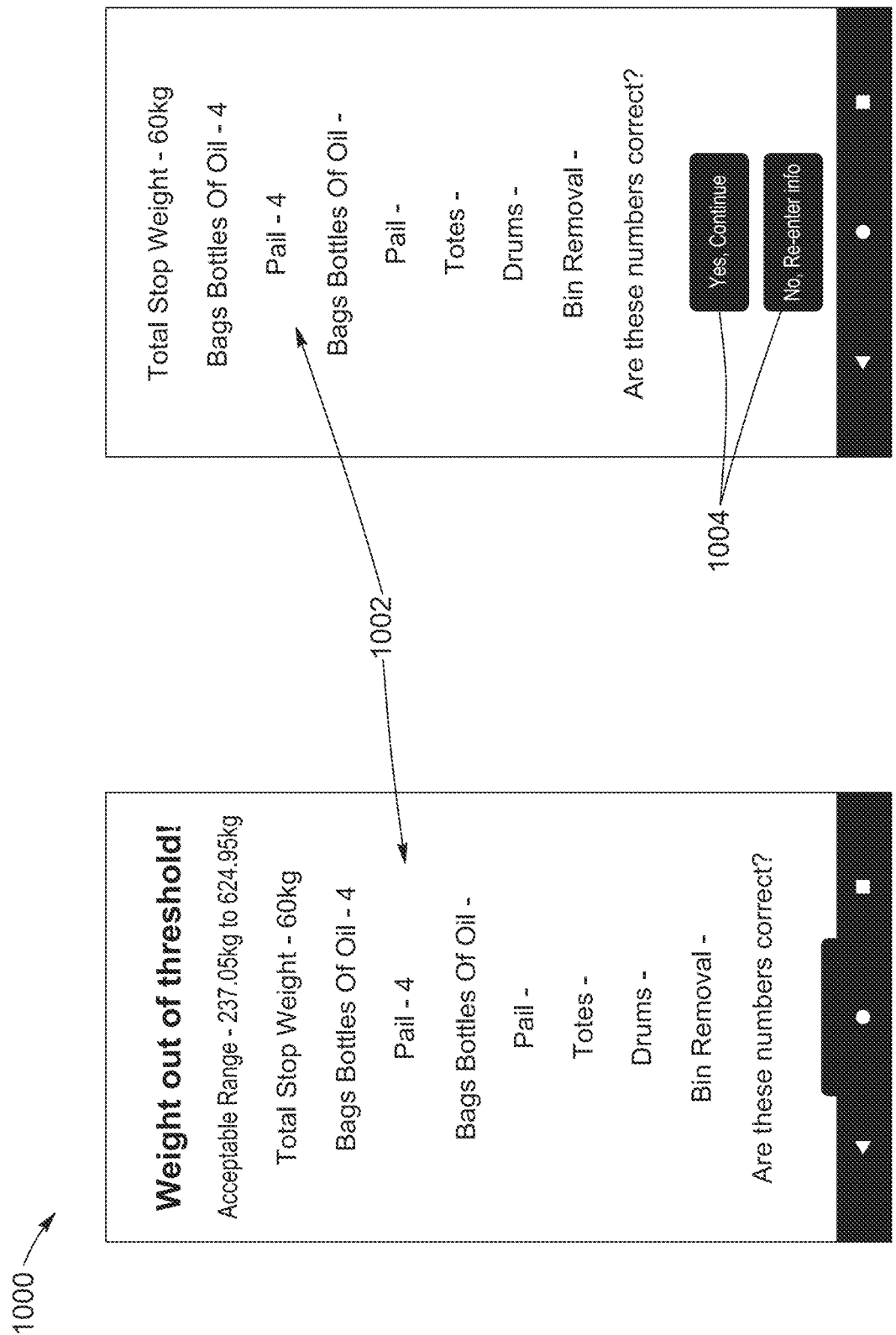

SYSTEM AND METHOD FOR DYNAMICALLY GENERATING COLLECTION ROUTES BASED ON PREDICTED ACCUMULATION OF INDUSTRIAL WASTE AND RECYCLABLES

TECHNICAL FIELD

The technical field of the present application generally relates to vehicle transportation, and more particularly relates to an efficient system and process for collecting industrial waste and/or recyclables.

BACKGROUND

Traditionally, collection services, such as industrial waste collection services, operate on fixed intervals. The waste collection schedule at a given collection site is typically determined when first contracting the waste collection service. Usually, collection is performed periodically, such as weekly, bi-weekly, or monthly. In such cases, vehicles are dispatched at fixed intervals at the sites to collect whatever waste has been accumulated so far, regardless of the accumulated waste quantity at the different the sites. Collection routes of traditional collection services are usually generated once, and repeatedly used thereafter, as the periodicity of collection allows for simple route planning. Those routes are usually fixed, and will change only when new clients, or sites, are added, or upon specific requests from the sites.

Meanwhile, some types of waste, such as potentially hazardous waste or recyclables, have been subjected to public programs or subsidies, such that a monetary compensation is associated with collecting such types of waste. Usually, the monetary compensation is proportional to the weight of waste collected, for example by defining a price per weight unit. The traditional collection services mentioned above, while quite simple to operate, have a few drawbacks that make them not ideal for collecting such waste.

There is therefore a need for a system for collecting waste that can be more efficient than traditional services.

SUMMARY

According to a first aspect, a system for generating industrial waste and/or recyclables collection routes, which includes collection sites to be visited by collection vehicles, is provided.

The system comprises a prediction module having at least one predictive model configured to predict industrial waste and/or recyclables accumulation, at each of the collection sites, based on historical accumulation data. The predicted accumulation of waste and/or recyclables can be updated as new historical accumulation data becomes available.

The system further comprises a simulation module operatively connected with the prediction module. The simulation module is configured to receive minimum and maximum site-specific waste and/or recyclables accumulation thresholds for each of the collection sites. The simulation module is also configured to identify, from the collection sites, the ones to be visited when their predicted accumulation of waste and/or recyclables is between their minimum and maximum site-specific thresholds. The simulation module can generate the collection routes by iteratively: constructing simulated collection routes based on the identified collection sites; determining whether the simulated collection routes respect route-specific thresholds, discarding the simulated collection routes that do not respect the route-specific thresholds, and selecting, from the remaining simulated collection routes, the collection routes which maximize collection profitability.

The system also comprises a user interface module configured to display, on electronic devices associated with the collection vehicles, the collection routes to be visited by the collection vehicles, and receive, on the electronic devices, actual accumulation data representing the accumulated industrial waste and/or recyclables being collected by the collection vehicle. This actual accumulation data is then added to the historical accumulation data.

The system further comprises a backend system connected to the prediction module, to the simulation module, and to the user interface module. The backend system comprises data storage storing the historical and actual accumulation data associated with each collection site, the generated collection routes, the minimum and maximum site-specific accumulation thresholds, and the route-specific thresholds. The collection routes are then traveled by the collection vehicles for collecting the waste and/or recyclables accumulated at the collection sites.

According to a second aspect, a method is provided for generating industrial waste and/or recyclables collection routes including collection sites to be visited by collection vehicles.

The method comprises a step of predicting, using one or more processors, industrial waste and/or recyclables accumulation, at each of the collection sites, based on historical accumulation data, the predicted waste and/or recyclables accumulation being updated as new historical accumulation data becomes available.

The method further comprises steps of receiving, by the one or more processors, minimum and maximum site-specific waste and/or recyclables accumulation thresholds for each of the collection sites, and identifying, using the one or more processors, from the collection sites, the ones to be visited when their predicted waste and/or recyclables accumulation is between their minimum and maximum thresholds.

The method further comprises a step of generating, using the one or more processors, the collection routes by iteratively constructing simulated collection routes based on the identified collection sites, determining whether the simulated collection routes respect route-specific thresholds, discarding the simulated collection routes that do not respect the route-specific thresholds, and selecting, from the remaining simulated collection routes, the collection routes which maximize collection profitability.

The method further comprises a step of displaying, using an electronic device, one of the collection routes to be visited, and receiving, by the electronic device, input data including actual accumulation data representing accumulated waste and/or recyclables being collected, the actual accumulation data being added to the historical accumulation data. The method comprises collecting, using the collection vehicles, the accumulated waste and/or recyclables at the collection sites included in the collection routes.

In possible implementations, the simulated collection routes are constructed by identifying, from the collection sites, main collection sites that correspond to large waste and/or recyclables generators, the collection routes being constructed by first adding the identified collection sites which are neighboring the main collection sites.

In possible implementations, the simulated collection routes can be constructed by identifying high-priority collection sites, where these high-priority collecting sites correspond to the collection sites having a predicted waste and/or recyclables accumulation greater than a maximum site-specific threshold. The collection routes are then constructed by first adding collection sites which are neighboring the high-priority collection sites.

In possible implementations, the prediction module can comprise a plurality of prediction models. The prediction module can be configured to select of one the prediction models based on the availability and/or the quantity of the historical accumulation data associated with a given collection site.

In possible implementations, the simulation module uses discrete event simulation modeling to generate the collection routes.

Other features of advantages of the present invention will be better understood upon reading example embodiments thereof, with reference to the appended drawings. While the invention will be described in conjunction with example embodiments, it will be understood that it is not intended to limit the scope of the invention to such embodiments. On the contrary, it is intended to cover all alternatives, modifications and equivalents as defined in the present application.

BRIEF DESCRIPTION OF THE DRAWINGS

FIG. 5 shows a Route Creation Log panel of the control module, according to an embodiment.

FIGS. 8A and 8B show data confirmation panels of the user interface, according to a possible embodiment.

DETAILED DESCRIPTION

Figure 1:
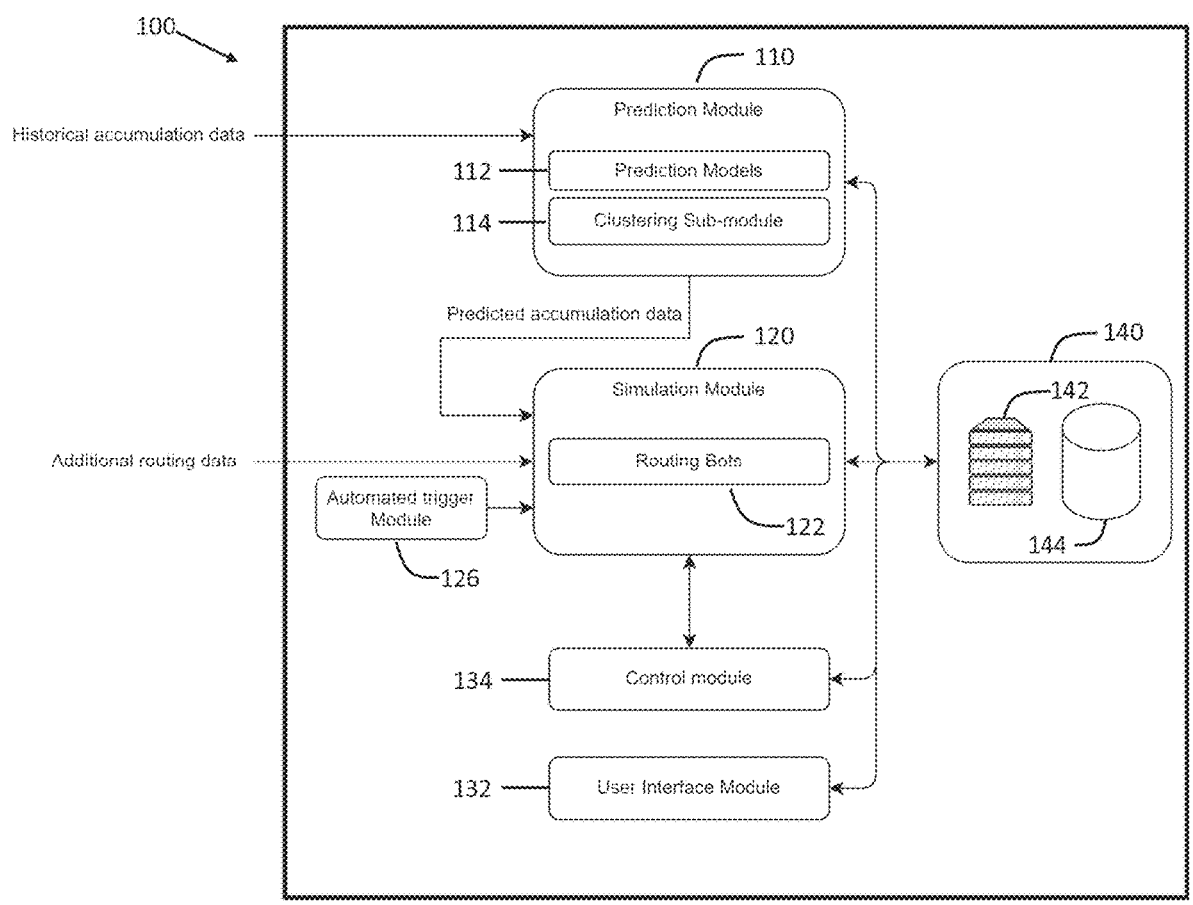
FIG. 1 is a schematic representation of a system for dynamically generating collection routes based on predicted accumulation of industrial waste and recyclables, according to a possible embodiment.

In the following description, similar features in the drawings have been given similar reference numerals and to not unduly encumber the drawings, some elements may not be indicated in some figures if they were already introduced in a preceding figure. The elements of the drawings are not necessarily depicted to scale, since emphasis is placed on illustrating the elements and the interactions between elements.

The system described below can dynamically generate collection routes. It is especially adapted for predicting the accumulation of industrial waste and/or recyclables at collection sites, such as in the form of contaminated containers, and for generating collection routes based on predicted accumulation and/or profitability at the collection sites. The waste and/or recyclables collected by the vehicles along the collection routes can be delivered to a triage center at the end of the collection route. Once sorted or processed, the waste/ recyclables can be brought to a recycling and treatment center for example. However, it will be understood that the embodiments and features described herein are non-limiting, and that the system and method can be implemented in any "reverse" transportation service wherein the transportation vehicles are filled along a route. Such transportation services can include residential waste, recyclables and/or compost collection, package returning services, and refurbishing and re-selling services.

In addition, while the system and method described below is especially adapted for the collection of industrial waste and/or recyclables, such as used oil, paint, latex, and pesticides containers, or other recyclable materials and business-to-business waste, the system and method can be adapted for the collection of other types of materials, such as used tires, cardboard, glass, plastic bottles, farming waste, or any other waste, by-products or recyclable materials. It will be understood that the system described herein is not limited to a particular type of waste or to a particular type of collection vehicle used. Further, in the following description, the term "waste" is used as a broad term and encompasses any type of waste or recyclables that can be collected by a collection service.

Further, the term "collection site" refers to a designated area where industrial waste and/or recyclables (or other types of waste) is accumulated or stored, and which can be accessed by the collection vehicles. Collection sites can be precise locations, such as farms, garages, or plants, or they can correspond to specific areas within larger sites.

System Overview

The system and method described herein can predict accumulation data which is indicative of the actual quantity (in weight, volume, number of containers or bags of containers) of waste and/or recyclables accumulated at a given time at different collection sites. The system and method can also dynamically generate collection routes for dispatching vehicles to collect the waste and/or recyclables before they exceed a given accumulation threshold. The collection routes are thus generated based on collection sites which have been identified as needing collection services. Generally, the system comprises a prediction module for predicting industrial waste and/or recyclables accumulation, a simulation module for creating and simulating collection routes, a control module for managing and modifying the collection routes, and a user interface for displaying routes to vehicle drivers and/or dispatch operators and for receiving and processing collection site data gathered by the drivers. In some embodiments, the modules can be separate hardware entities. However, in preferred embodiments, the modules are stored on storage means, such as cloud-based servers. The system also preferably includes a backend system for interconnecting the modules, and for providing the storage for the modules and data used by the system.

Prediction models are used to predict industrial waste accumulation at each of the collection sites, and route simulation is used to create and simulate collection routes used before dispatching collection vehicles based on the predicted waste accumulation. For example, route simulation can be used to create optimized routes comprising a number of collection sites needing collection. When dispatched, the collection vehicles collect the waste and/or recyclables accumulated at the sites along the collection routes, in part or in whole depending on vehicle's filling capacity, before heading to collection or triage centers for emptying the vehicles.

Compensation can be tied to the collection and recycling of different types of waste, including contaminated containers that still contain or used to contain hazardous products, such as paint, oils, and pesticides. For example, public programs can offer an amount per weight for collected and/or recycled products. Other types of waste, such as metals, can also have a value when recycled. In such cases, the present application advantageously allows for maximizing profitability associated with collecting those types of waste by dispatching collection vehicles only when necessary and optimizing the use of collection vehicles based on distance travelled and vehicle capacity for example, while ensuring that collection sites do not become saturated with waste. The system is particularly suited for providing a dynamic industrial waste and/or recyclables collection service to various collection sites that can have different accumulation rates and different collection needs.

The system and method described herein advantageously minimizes environmental impact of a collection service by reducing unnecessary travelling of collection vehicles, which are typically large trucks, by better grouping of the collection sites to be visited, and reducing millage per weight or volume of waste and/or recyclables picked up and transported. Further, the system allows for adjusting to seasonality and business conditions impacting waste accumulation across a plurality of collection sites, and for calculating expected need for resources, including collection vehicles and drivers, consequently. The proposed prediction and simulation modules also improves on existing methods in that their interdependency and synergy results in a more efficient use of processing capacities of the computers and servers involved in the process of generating the collection routes. The interaction of the prediction module and of the simulation module allows converging more rapidly towards the generation of the collection routes, thus improving of processing capacity and memory usage.

Turning to FIG. 1, the system for dynamically creating collection routes 100 comprises a prediction module 110, a simulation module 120, a user interface module 132 and a control module 134. The system further comprises a backend system 140 interconnecting the different modules of the system 100. For example, the backend system 140 comprises one or more servers having one or more processors and storage means (including transitory and non-transitory memory) storing processor-executable instructions for executing program code of the prediction module 110, the simulation module 120 and the control module 134. In some embodiments, the backend system can also store processor-executable instructions for executing program code of the user interface module 132. The storage means further store all associated data, such as historical accumulation data, predicted accumulation data and generated collection route data. The backend system can also perform additional tasks such as data processing and analytics.

Prediction Module

The prediction module 110 is configured to predict the accumulation of waste and/or recyclables for each collection site. In the system, a collection site can correspond to one or more data records or data entries, including a geographic location, information on the site and/or on the client, on the type of containers or waste generated at the site, and historic data relating to the visits and quantities of containers collected (in terms of weight, bags, bins, etc.). The system 100 comprises at least one prediction model 112, that can be used to predict the accumulation of waste and/or recyclables at a given site, over time. Preferably, a plurality of prediction models 112 can be used, depending on input data available. The prediction models 112 can include, without being limited to, mathematical models and machine-learning models, or various algorithms. The prediction models 112 use historical accumulation data associated with a given collection site as input data to predict waste accumulation of the given site. As the actual accumulation can depend on the seasons or on business conditions for example, the prediction module 110 allows for adapting the frequency of the collection service to such factors. In a preferred embodiment, the prediction module 110 comprises three different prediction models 112 that are used depending on the availability of historical data. For example, when on-boarding a new customer or collection site, historical accumulation data may be inexistant. In such a case, a first prediction model 112, is used to predict waste and/or recyclables accumulation for that collection site. For example, the predicted accumulation can be calculated as a quantity of contaminated containers, bags, or raw waste. In alternative embodiments, an accumulation rate is estimated based on the business type and/or the size of the collection site. A fixed collection schedule may be implemented for the new collection site based on the predicted or estimated waste accumulation. After historical accumulation data has been gathered for some time, for example after a given number of visits, the prediction module 110 can be changed to another prediction model that is best configured to predict the accumulation of waste and/or recyclables using historical accumulation data, collected by the vehicle operators during their last visits. For example, the prediction models 112 can include an Autoregressive Integrated Moving Average (ARIMA) model or algorithm model, used when historical accumulation data is available, a Croston model, used when available historical accumulation data is limited, and a custom-built tool, a "for service" tool, used when no historical accumulation data is available.

Historical accumulation data is any relevant data associated with the waste and/or recyclables at a given collection site. In a preferred embodiment, historical accumulation data corresponds to the actual waste and/or recyclables collected by collection vehicles at a given collection site and can be defined as container weight, for example. Historical accumulation data may additionally or alternatively include a quantity of container or bags of containers, or a volume, for example. The prediction module 110 is configured to recalculate new predicted waste accumulation at a given collection site as new historical accumulation data becomes available. The predictions can thus be constantly or periodically updated or be updated when receiving a trigger that new collection data is available for a given site. When a collection vehicle collects the waste and/or recyclables of the given collection site, actual accumulation data at the collection site is gathered according to the method described herein. The historical accumulation data can be the actual accumulation data or derived from it. The vehicle operators can input the accumulation data through the user interface module 132, as will be described in more detail below. Alternatively, the end customer can disclose or input the real or estimated quantity of accumulated containers at their site.

The prediction module 110 can further include a clustering sub-module 114. The clustering sub-module 114 is configured to classify the collection sites into clusters. For example, when on-boarding new collection sites, site characteristics are provided for identifying the type of collection site, such as type of waste generated and maximum accumulation capacity, a location, a type of business (e.g., a farm, a garage or a plant). For example, the process of on-boarding a new collection site can include classifying the collection site into one of a number of site types. The clustering sub-module 114 uses the site characteristics of every collection site as inputs to machine-learning algorithms adapted to generate site clusters and to automatically classify the existing collection sites, and new collection sites, into the clusters. The clusters group together collection sites sharing similarities, such as geographical location, type of waste generated, and accumulation behaviour.

When a collection site has no or limited historical accumulation data available, the prediction module 110 can use historical accumulation data of other collection sites grouped within the same cluster as the given collection site. For example, the predicted accumulation of the given collection site can be calculated using historical accumulation data of one or more collection sites having a similar business model, similar type of generated waste, and a similar collection site size or maximum accumulation capacity. In other words, when historical accumulation data for a given collection site is unavailable or insufficient, such as when on-boarding a new collection site, the prediction module 110 can predict accumulation based on waste and/or recyclables accumulation data from other similar collection sites.

Alternatively, when no historical accumulation data for a given collection site is available, historical accumulation data can be estimated based on the site characteristics received when on-boarding the given collection site. For example, the site characteristics can include current periodicity of waste collection, estimated accumulation rate and maximum accumulation capacity. The prediction module 110 uses the estimations of historical accumulation data to predict waste accumulation for the given collection site. After a number of actual accumulation data is gathered when collecting the waste and/or recyclables at the collection site, the actual accumulation can be used as historical accumulation data, and the prediction module 110 can switch to a prediction model 112 adapted to predict waste accumulation of the given collection site based on the historical accumulation data.

In some embodiments, the prediction module 110 is further configured to evaluate the accuracy of the prediction models 112. The evaluation can comprise a step of comparing the predicted waste accumulation with actual accumulation collected at the collection sites. The prediction module 110 can therefore determine the accuracy of the prediction model used. When the actual accumulation substantially matches the predicted accumulation, no change will be made to the prediction models. However, if there is a mismatch between predicted accumulation and actual accumulation, e.g., the predicted accumulation is between the minimum and the maximum thresholds while the actual accumulation being below the minimum threshold or above the maximum threshold, the prediction module 110 can change the prediction model 112 used for predicting waste accumulation. Alternatively, the prediction model can be retrained, or their hyperparameters can be changed to best predict the quantity, volume or weight of the accumulated waste. In some embodiments, when the prediction module 110 calculates predicted accumulation for a given collection site, a status is associated to the collection site. For example, the status can be used to indicate whether the collection site is due for collection or overdue, or if the collection site is associated with a call lodged at the collection service. Further, a status can indicate that the predicted accumulation is close to, but still below the minimum threshold of the collection site, indicating that the site is almost due for collection. When evaluating the accuracy of a prediction model, the prediction module may determine that the accuracy of the model is satisfactory if the status associated with the predicted accumulation is the same as a status corresponding to the actual accumulation. However, if the mismatch between actual accumulation and predicted accumulation is such that the status would need to be changed to reflect the actual accumulation, the prediction module 110 may change the prediction model 112 used for predicting accumulation of that collection site.

It will be understood the machine-learning-based prediction module allows for adaptively predicting waste accumulation at collection sites, taking into account seasonality and other factors affecting the rate of waste and/or recyclables accumulation.

An optional data preparation module can additionally be used to prepare and process raw collection site data into data used by the system, by normalizing and standardizing the data, for example. Each collection site is associated with master data, such as address, contact, location and type of business, and operation data, such as actual accumulation data. The data preparation module can be configured to normalize both the master and operation data. As will be detailed below, operation data is gathered when collecting the waste and/or recyclables for example, and this data can be used as historical accumulation data. The data preparation module is used to convert raw input data into historical accumulation data that can be used by the prediction module 110.

Thresholds and Collection Sites

Before generating the collection routes, a list of collection sites to be visited is built. When the predicted waste accumulation is below a minimum threshold for a given collection site, said collection site is not added to the list of collection sites as visiting this collection site would not be profitable. When the predicted waste accumulation is between the minimum threshold and a maximum threshold, the collection site is added to the list. When predicted accumulation of a collection site exceeds the maximum threshold, the collection site can be flagged as a high-priority collection site.

Each collection site is associated with respective minimum and maximum thresholds. The minimum threshold defines a minimal quantity of waste and/or recyclables, for example a quantity of contaminated containers, that needs to be accumulated at a given collection site before dispatching a collection vehicle becomes profitable. Profitability associated with visiting a collection site can be calculated based on potential gross profit and collection costs associated with the collection site. Collection cost is indicative of the costs of visiting the collection site and can include distance from a triage center, for example. The collection cost can also be calculated based on the geographical region of a given collection site. For example, the collection cost can include the cost of dispatching a collection vehicle to the geographical location. The collection cost can also, alternatively or additionally, be calculated by splitting the costs of dispatching a collection vehicle in a given geographical region between the collection sites located in that geographical region. Gross profit can be calculated based on the type of waste and the monetary compensation associated with that type of waste. A profitability margin can be defined, such that gross profit must be at least X % greater than the collection costs, for example. Therefore, using the monetary value of the type of waste of a collection site, a minimal quantity of waste to be collected can be calculated for the potential gross profit to equal collection costs. Profitability of visiting a collection site is therefore associated to a minimum quantity of waste and/or recyclables to be collected.

The second threshold defines a maximal quantity of accumulated waste beyond which the maximum capacity of a collection site is exceeded, or an agreed-upon maximum quantity of waste tolerated by a client associated with the collection site. Waiting for waste and/or recyclables to accumulate over such a limit can result in unsatisfied clients who may lodge a call at the collection operator to schedule urgent collection. The maximum threshold can be directly representative of the maximum accumulation capacity of a given collection site, or alternatively be defined as a ratio of a maximum accumulation capacity. For example, when a collection site is visible from the street, the maximum threshold may be modified to ensure that the waste and/or recyclables do not become visible from the street. The maximum threshold can initially be determined manually or based on the size of the collection and the type of business associated with the collection site. The maximum threshold can also be subsequently adjusted based on lodged calls or actual accumulation data collected.

Those thresholds can be determined manually when onboarding new customers or when adding new collection sites. However, in preferred embodiments, the thresholds are automatically calculated by an automated trigger module 126. For each collection site, the automated trigger module 126 calculates initial minimum and maximum thresholds based on site characteristics and information gathered when on-boarding a new collection site, such as estimated accumulation rate, type of waste, type of business geographical location, and based on economic value associated with the type of waste accumulated and on customer satisfaction objectives. For example, the thresholds can be determined by optimizing a profitability function or optimizing client satisfaction, or both. The automated trigger module 126 calculates the thresholds to obtain optimal threshold ranges between which collection of accumulated waste and/or recyclables should be performed. The thresholds can be recalculated when a number of collections have been performed at a given collection site for example, allowing for improving the thresholds and providing more accurate triggers for visiting the collection sites. Those thresholds are used to determine whether any given collection site is to be added to collection routes, as will be described later.

Simulation Module and Route Creation

The simulation module 120 is configured to generate collection routes from a list of collection sites to be visited by collection vehicles. The collection routes each include a number of collection sites to be visited along the route.

Figure 3:
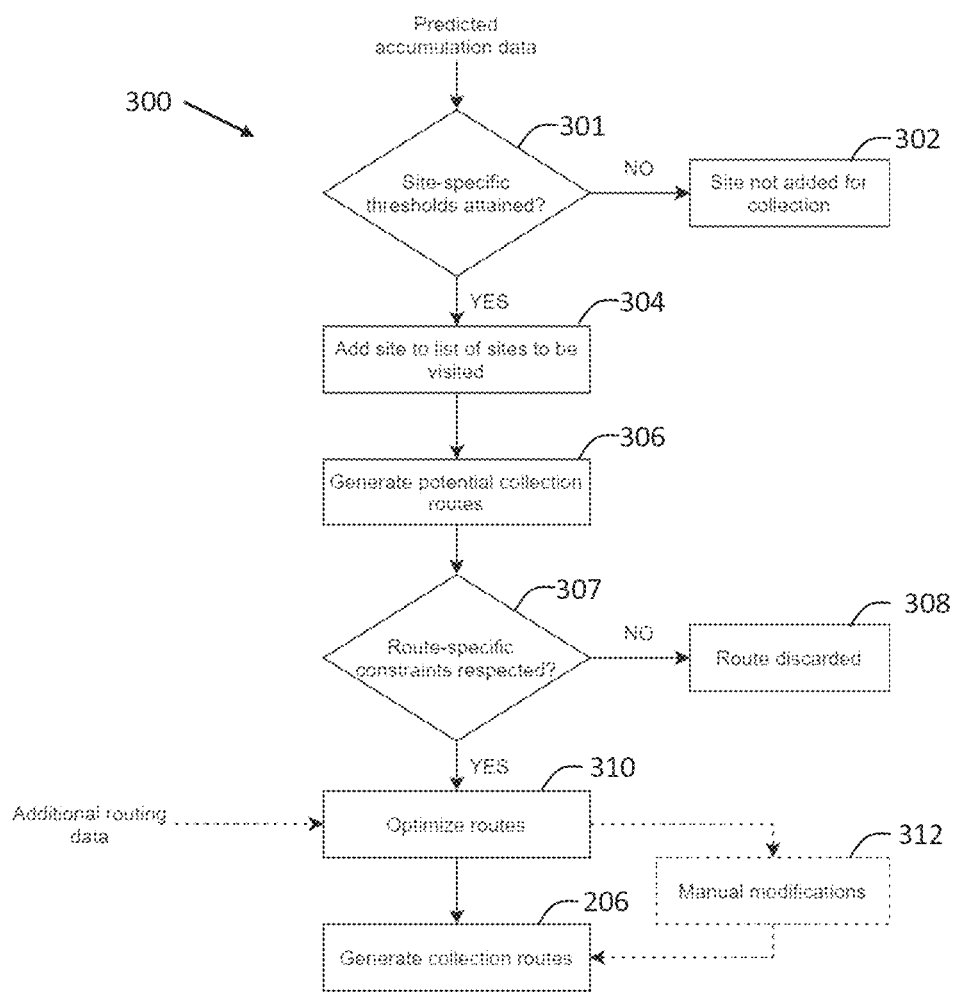
FIG. 3 is a flowchart of the steps for generating the routes, according to the embodiment of FIG. 2.

Referring to FIGS. 1 and 3, the simulation module 120 uses routing bots 122 that are configured to construct, or generate, the routes based on varying parameters, for example allowing for emulating humans constructing the routes, and according to method 300. The simulation module 120 receives the predicted waste accumulation of the collection sites as inputs that bots 122 use to determine which collection sites will be added to the list of collection sites to be visited. For each collection site, their predicted accumulation is compared with their minimum and maximum thresholds, or site-specific thresholds, at step 301. For example, collection sites are added to the list or their visit is triggered at step 304, when their predicted accumulation is between their minimum threshold and their maximum threshold. Sites that are below their minimum threshold will not be added (step 302). Additionally, bots 122 may identify high-priority or critical collection sites, such as sites for which predicted accumulation has exceeded the maximum threshold and for which collection must be prioritized.

Once the list of identified collection sites is determined, bots 122 proceed to generating potential collection routes at step 306, and simulating collection operations corresponding to the collection vehicles collecting the waste and/or recyclables along the routes. Simulating the generated collection routes allows for assessing feasibility, such as time needed for completing a route, and profitability of each route, and planning for various route conditions, such as traffic and construction zones. Consequently, when generating the collection routes, bots 122 may also select which resources, for example collection vehicles and drivers, to associate with the collection routes. The simulation module 120 uses discrete simulation methodology to simulate collection operations of the collection vehicles travelling and collecting waste and/or recyclables along the routes, thereby creating a digital twin of actual collection routes. Simulating the collection operations along the generated collection routes allows for evaluating and distributing the workload across available resources, such as balancing total waste to be collection among the collection vehicles. For example, some collection sites may be transferred from one collection route to another for balancing travelling time and/or quantity of waste and/or recyclables collected between the two collection routes. Once the collection routes are generated, bots 122 verify that the generated collection routes respect route-specific constraints at step 307. Route-specific constraints are constraints that each route must meet, or adhere to, independently of the collection sites to be visited and the site-specific constraints. For example, the route-specific constraints can include minimum profitability of the route, total travelled distance, and minimal quantity and/or weight of collected waste, and vehicle-related constraints such as maximum payload capacity of the vehicles. Further, the route-specific constraints can include driver-related constraints such as maximum driving time. When a generated collection route does not respect all the route-specific constraints, the route is discarded at step 308. However, when a generated collection route contains a high-priority collection site, the collection route may be kept for dispatching even if not all the route-specific constraints are met.

The simulation module 120 may also discard a collection route even though all the route-specific constraints are met. When the number of generated routes is higher than the number of available collection vehicles, some routes may be discarded. For example, the generated routes may all be compared with each other to discard the routes with lower profitability or with lower predicted waste collection. The simulation module 120 may also simulate the routes again, with added constraints or priorities, such as prioritized clients and collection sites or collection sites associated with a call lodged to the collection service, or by increasing profitability thresholds, for example, the goal being to reduce the number of generated collection routes that are not discarded by the simulation module 120. When a given route is not discarded by the simulation module 120 for one of the reasons detailed above, it is added to the collection routes to be dispatched. The output of the simulation module 120 is a list of collection routes each comprising a list of collection sites to be visited. Each collection route includes an ordered list of collection sites to be visited, a predicted weight associated with each of the collection sites, and the status of the collection sites, for example.

In some embodiments, a step of optimizing the routes (step 310) using artificial intelligence such as Microsoft Bonsai, is performed by the bots. The route optimization can include, for each collection route, iteratively calculating variants of the route in order to optimize distance, travelling time, or profitability, for example. In some embodiments, a multi-route optimization approach is used, for accelerating optimization of all the collection routes generated.

In some embodiments, additional routing data is used by the bots when generating or optimizing the collection routes, such additional routing data including, without being limited to, predicted weather, traffic conditions, announced road closures, regional laws such as winter tire enforcement, and holidays, or any other information that may influence capability of the collection vehicle to reach the collection sites and collect the accumulated waste and/or recyclables. Further, an additional step of manually modifying the routes (step 312) can be performed before the collection routes are finalised for dispatch. Manual modifications allow for adding and/or removing individual collection sites, adding and/or removing entire collection routes or segments thereof. Such manual modification can be performed using the control module 134, which is described later.

In some embodiments, bots 122 generate collection routes taking into account site characteristics of the collection sites to be visited. For example, some collection sites may require a given type of collection vehicle or equipment, and a collection route can be specifically generated for those collection sites needing particular resources.

Route Generation Modes

Bots 122 can use a variety of generation modes to generate the routes, non-limiting examples of which are detailed herein. A large-generator mode consists of identifying collection sites, named large generators, producing a large quantity of waste and/or recyclables, or at least at a higher rate than average accumulation rate across the collection sites. When generating the routes, bots 122 start by adding the large generators to the collection routes, and subsequently adding collection sites neighboring the large generators to the routes. For example, collection sites are added to a collection route until a maximum weight and/or until a maximum time for completing the route is reached. A geographical mode consists of identifying geographical regions delimited for example by a maximum travelling distance within those regions or by natural and/or man-made obstacles hindering travel. Once the geographical regions are identified, the collection routes are generated by grouping collection sites from a same geographical region into collection routes. A high-priority mode consists of identifying high-priority collection sites, such as collection sites having their predicted accumulation exceeding or nearing their maximum threshold, or collection sites manually identified by an operator. Collection sites can also be identified as high-priority collection sites when complaints are lodged by a customer, or according to premium service contracts, for example. Once the high-priority collection sites are identified, bots 122 start generating the routes by adding the high-priority collection sites to the collection routes, and subsequently adding collection sites neighbouring the high-priority collection sites.

In some embodiments, the collection route generation is further based on a type of industrial waste or recyclables, for example, associated with the collection sites. For example, bots 122 can create collection routes only comprising collection sites accumulating a given type of waste. Alternatively, the type of waste can be intentionally mixed within a same collection route. In such a case, the mixed waste can be sorted at a triage center.

Bots 122 generate each collection route successively in order to obtain the collection routes. However, it will be understood that multiple routes can be generated simultaneously, allowing for faster route generation.

Backend System

Referring back to FIG. 1, the system for dynamically generating collection routes 100 further includes a backend system 140, which comprises one or more servers 142 with one or more processors and storage means. The prediction module 110, the simulation module 120, the user interface module 132, the control module 134, and the automated trigger module 126 are all in communication with the backend system 140, allowing for exchanging information between the modules. When the modules are software-implemented, the storage means also store processor-executable instructions that when executed by the one or more processors, perform the steps associated with the modules. The backend system 140 is also configured to store any information relevant to the functioning of the system described herein. For example, the backend system 140 comprises one or more databases 144 for storing all the collection sites and associated site characteristics, site-specific thresholds and predicted waste accumulation data. Further the database stores the collection routes generated by the simulation module along with route-specific constraints. The backend system 140 also stores all actual accumulation data gathered using the user interface module 132 and used as historical accumulation data by the prediction module 110. When the user interface module 132 is a web-based application, the application can be stored on the storage means of the backend system. It will be understood that the backend system 140 can be a local computer or server or any type of remote server and/or computing cloud.

User Interface Module

The system 100 further comprises a user interface module 132 for receiving inputs from the collection vehicle drivers and for displaying indications and information to the drivers. The user interface module 132 is a computer application that can be installed on electronic devices, such as a smartphone, a portable computer, or a tablet, for example. Alternatively, the user interface module can be a web-based application accessed using said electronic devices. The user interface module 132 allows for displaying, on an electronic device, collection routes to be travelled by the collection vehicles. The information displayed on the electronic device can include the ordered collection sites, planned routing, and time of arrival at the collection sites or at a final site, such as a triage center.

Figures 6A, 6B:
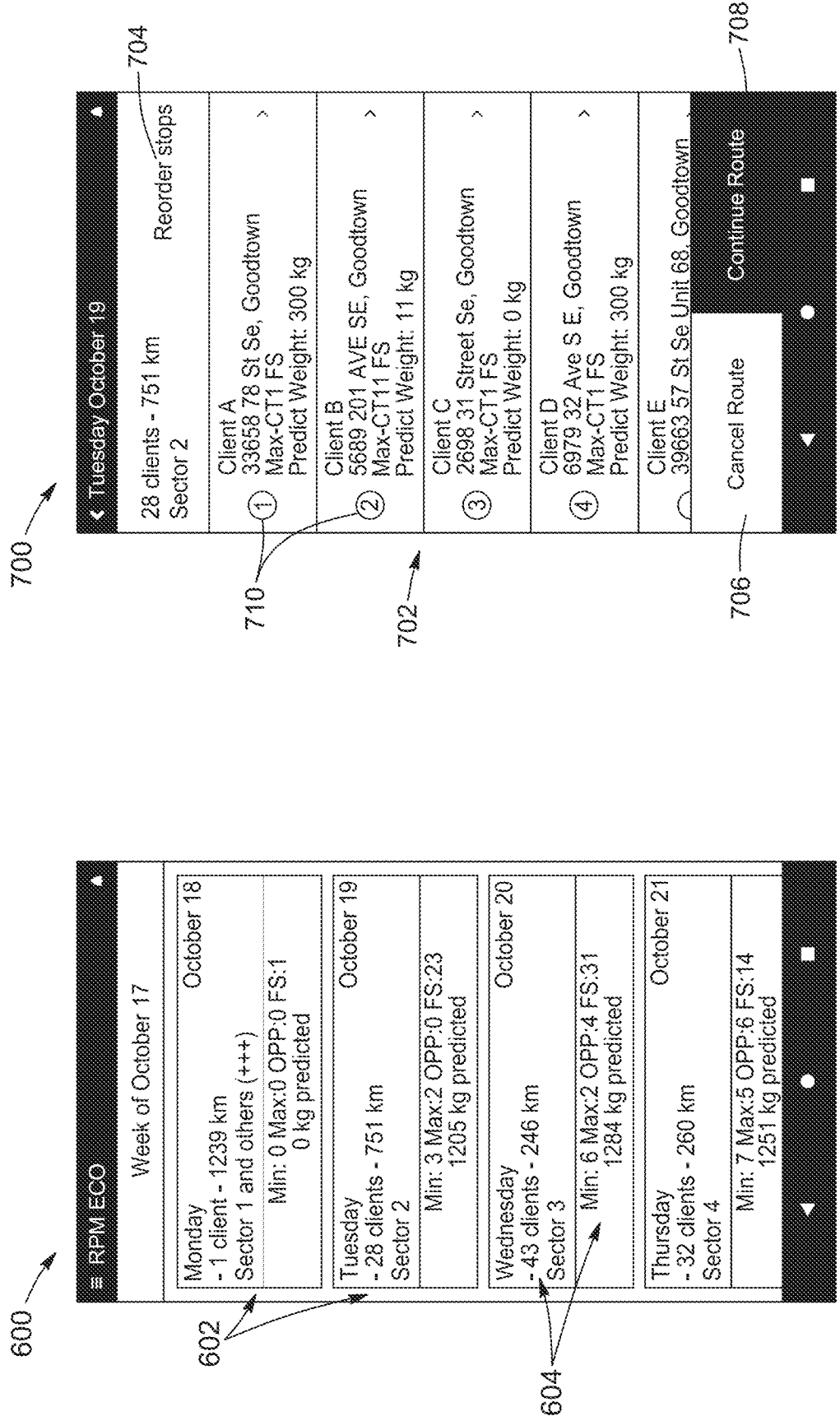
FIGS. 6A-6C show collection route display panels of the user interface, according to an embodiment.
Figure 6C:
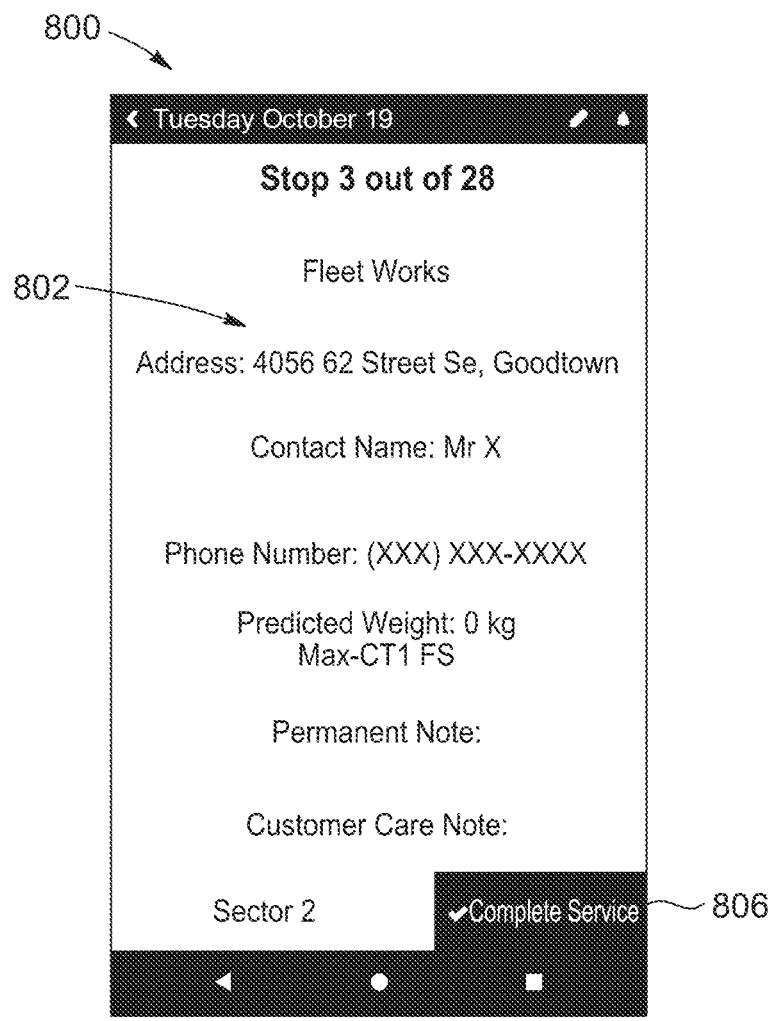

Turning to FIG. 6A, the user interface module 132 comprises a Route overview panel 600 adapted to display a list of available routes 602, such as a week's worth of collection routes associated with a driver. Available routes can include new collection routes, not-started routes, and uncompleted routes, for example. Each route of the list of available routes 602 contains route-related information 604, including distance to be travelled, a number of collection sites to be visited, predicted total accumulation, and so on. A user, or driver, can select one of the available routes, and be presented by a Route preview panel 700, as shown in FIG. 6B. The Route preview panel 700 is adapted to display further details about a selected collection route. The Route preview panel 700 includes an ordered list 702 of collection sites, or stops, associated with the selected collection route. The panel 700 includes a Reorder button 704 allowing a driver to reorder the stops if needed. For example, if an unforeseen event unfolds while the driver is travelling along a collection route, such as a road closure, the list of collection sites can be re-ordered to by-pass the road closure. A Cancel route button 706 allows for cancelling the collection route and returning to the Route overview panel 600 for selection of another collection route, for example. Indicators 710 are displayed on the Route preview panel 700 allowing to quickly identify the status of the stops. For example, a Complete indicator is associated with completed stops, a Cancelled indicator is associated with cancelled stops, and a Pending indicator is associated with pending stops along the route. Upon clicking or selecting the Continue route button 708, the user or driver is presented with a Navigation panel 800, shown in FIG. 6C. The Navigation panel 800 includes detailed site information 802 associated with the next collection site along the route. The next collection site corresponds to the first collection site in the ordered list 702 of collection sites having a Pending indicator. The detailed site information 802 includes a contact name and phone number, a complete address of the collection site, and any relevant additional information. Optionally, the Navigation panel 800 can include detailed directions and/or real-time driving directions for travelling to the collection site.

Figure 7B:
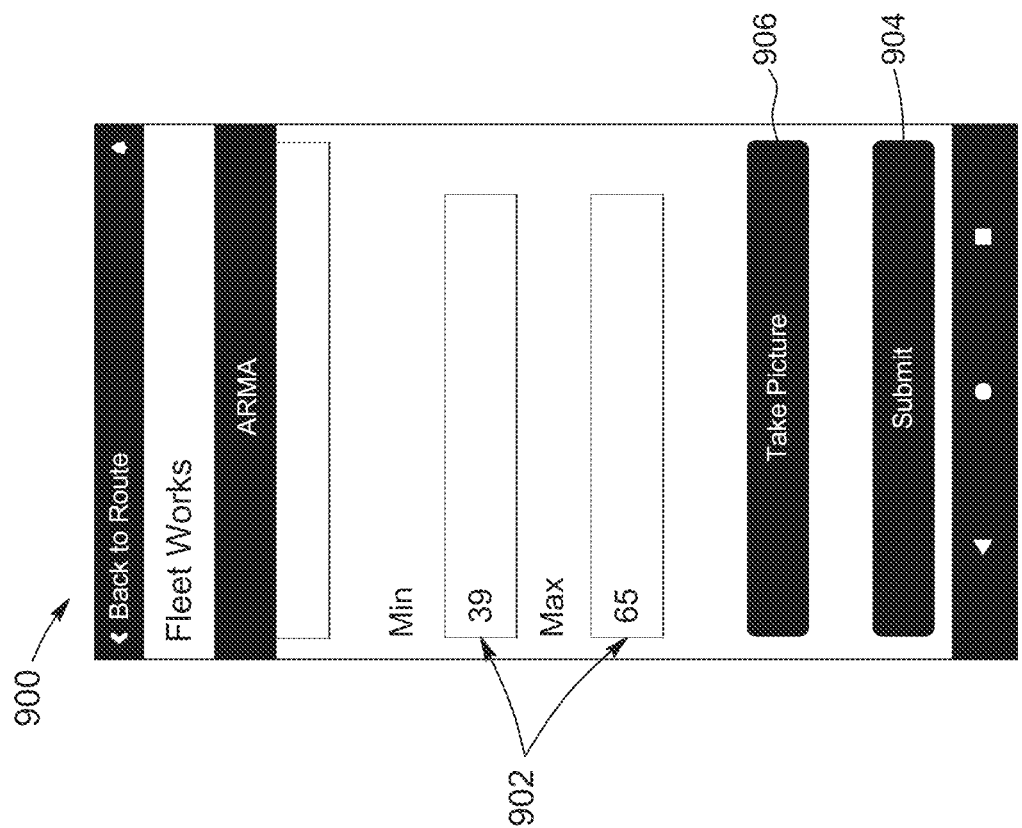
FIGS. 7A and 7B show a data entry panel of the user interface, according to a possible embodiment.
Figure 7A:
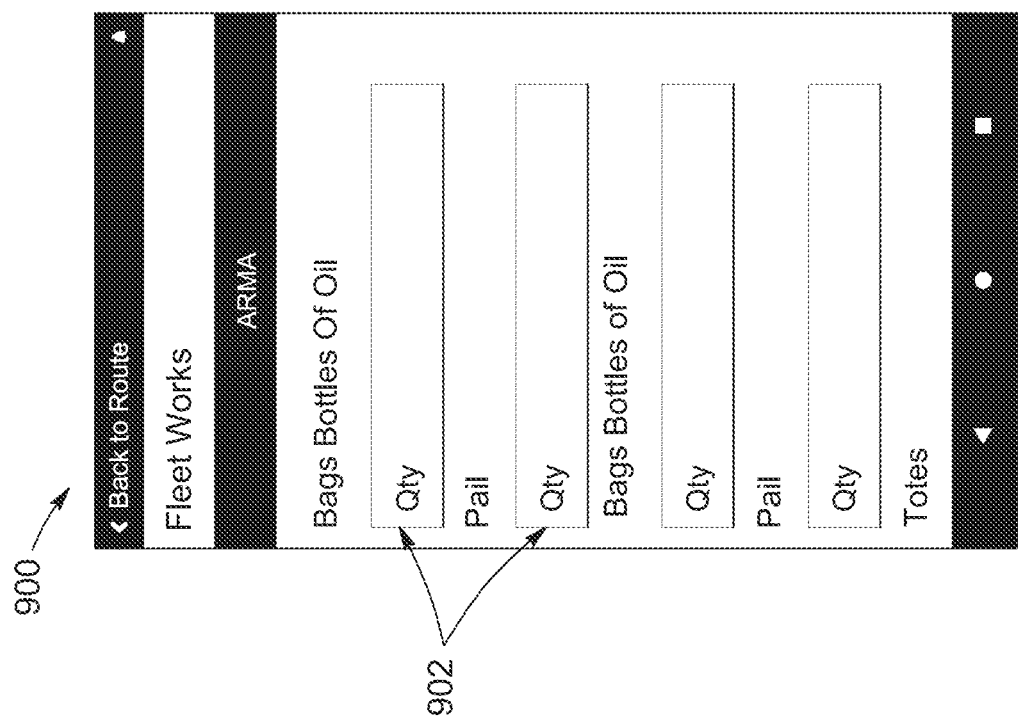

The user interface module 132 is also configured to receive inputs from the drivers when collection of waste and/or recyclables is performed. As such, upon interacting with the Complete service button 806 on the Navigation panel 800, the driver is presented with a Site submission panel 900 shown in FIGS. 7A & 7B. The Site submission panel 900 allows the driver to input actual accumulation data 902 associated with the currently visited collection site. The actual accumulation data 902 can include the weight and/or the volume of the containers, bags or waste collected at each collection site, or the number of waste bags and/or containers collected, and pictures of the collected waste. The actual accumulation data 902 is representative of the actual accumulation at each of the collection sites. Pictures of the waste/recyclables collected can be taken by clicking on the Take picture button 906. It will be noted that the actual waste collected can be indicative of the entirety of the waste and/or recyclables accumulated at a collection site, or alternatively only a portion of it, for example when the collection vehicle reaches full capacity before having emptied the collection site. The collection data inputted by the driver along with any pictures are stored in the database 144 of the backend system 140 when the site is submitted by clicking on the Submit button 904.

Optionally, a Site validation panel 1000, as shown in FIGS. 8A and 8B, is displayed after the site is submitted, allowing for validating and/or modifying collection data 1002 inputted by a driver. For instance, when the actual accumulation data 902 of a given collection site does not match the predicted accumulation associated with the given collection site, the Site validation panel 1000 is displayed to the driver for validating that no input error has occurred. The driver can either confirm that the inputted data is correct or correct any data entry error, using the interactive buttons 1004.

Figure 9B:
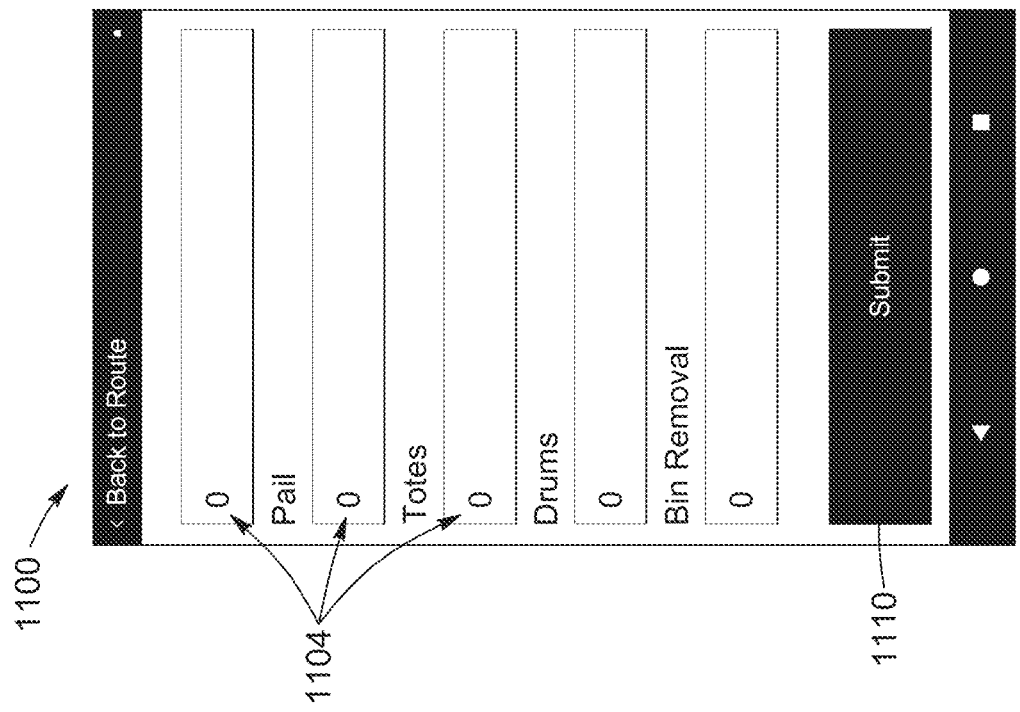
FIGS. 9A-9C show route submission panels of the user interface, according to a possible embodiment.
Figure 9A:
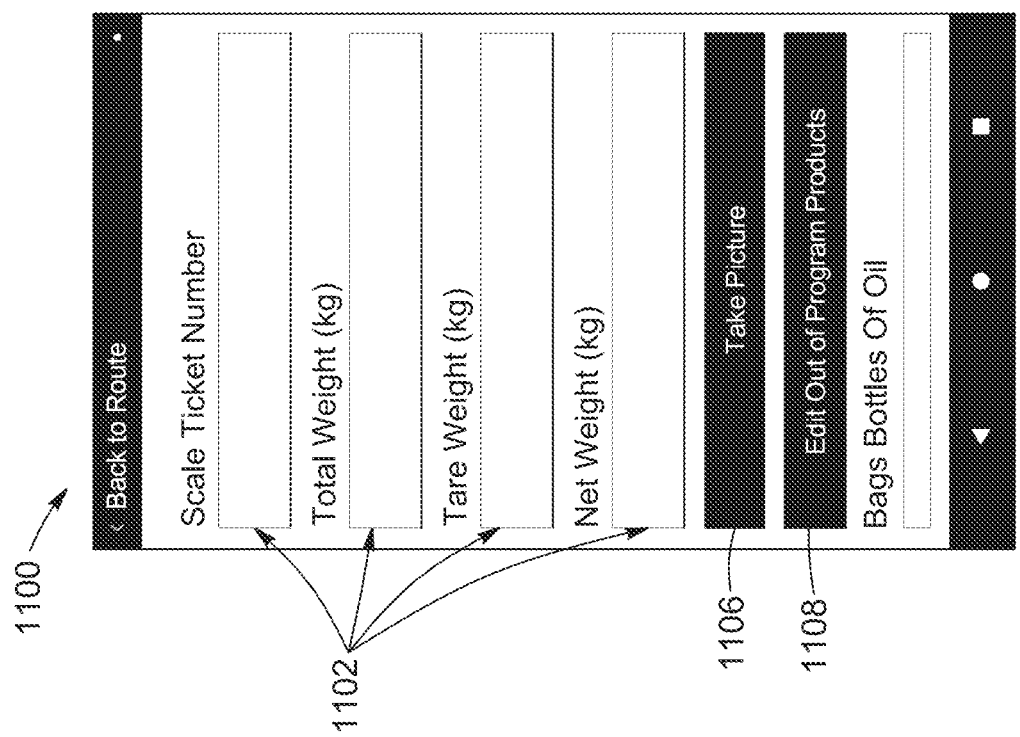
Figure 9C:
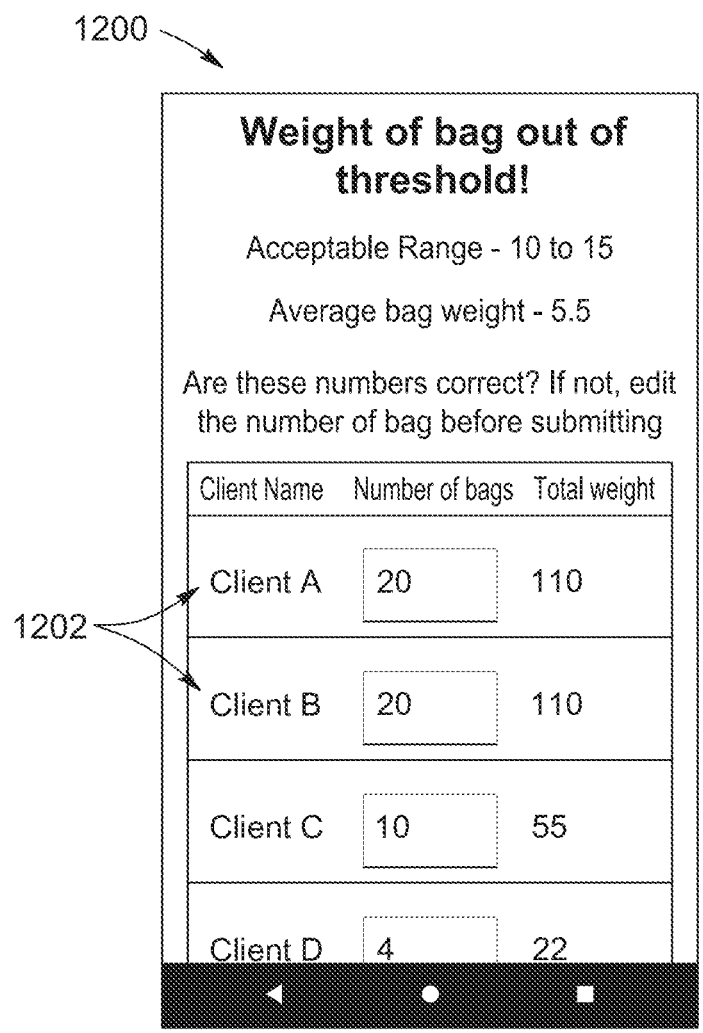

Once every collection site along the collection route has been visited and actual accumulation data for those collection sites has been collected, a Route submission panel 1100, shown in FIGS. 9A & 9B, is displayed. In a preferred embodiment, the collection vehicle is weighted at the end of the collection route, once all the collection sites have been visited. In such a case, the Route submission panel 1100 is used to input route-related data 1102 such as the total scaled weight of the vehicle, the tare weight of the vehicle, a scale ticket number, and net weight, which corresponds to the weight of collected waste and/or recyclables. Pictures may be taken using the Take picture button 1106 to confirm the weight measured by the scale, for example. From the calculated net weight, an average weight for each bag and/or container collected can be calculated. As explained elsewhere in the description, the actual waste collected at each collection site is then determined by multiplying the average bag/container weight with the number of bags/containers collected at the collection site as inputted using the Site submission panel 900. The Route submission panel 1100 also displays overall collection quantities 1104, such as the total number of bags/containers collected along the collection route. If the driver notes an error in the overall collection quantities 1104, it is possible to make corrections by clicking on the Edit button 1108 and editing the erroneous fields. Upon submitting the collection route using the Submit button 1110, the system may determine whether there are discrepancies between actual waste collected and predicted accumulation. Consequently, a Route validation panel 1200 (FIG. 9C), similar to the Site validation panel, may be displayed to the driver with a list of the collection sites 1202 and their associated actual accumulation data, allowing for reviewing inputted actual accumulation data for each of the collection sites along the collection route.

Upon arriving at a collection center or triage center, and upon submitting the collection route, the system can display a panel enabling the driver to take a picture of the confirmation of delivery at the collection center. For example, a Quick Response (QR) code or any kind of receipt may be generated once the collection vehicle is emptied at the collection center. The driver can take a picture of such a receipt and the picture will be transmitted to the database of the system.

In some embodiments, the user interface module 132 is also configured to receive new collection sites to be visited while the collection vehicle is already travelling along the collection route. Those new collection sites can be added by a collection vehicle driver using the user interface module 132, or by an operator using the control module 134. The added collection sites can be added as a next stop along the collection route, or at any point along the collection route. Further, the user interface module 132 can allow for manually adding, by a driver, a collection site along the collection route. As described elsewhere, the collection sites can be associated with various statuses, indicating whether collection is due/overdue or not. A special status can be used for collection sites having a predicted accumulation below but close to their minimum threshold. Such a status represents an "opportunity" of collection. If a vehicle driver completing a route observes that the collection vehicle still has room for additional waste, he can add, using the user interface module 132, an "opportunity" collection site to the list of collection sites to be visited.

Control Module

The system 100 further comprises a control module 134, as a computer application installed on a control computer, or a web-based application accessed by the control computer, for example. The control module 134 allows for visualising the routes generated by the simulation module 120. For example, an overview of all the coverage offered by the generated routes, along with an indication of every collection site visited can be displayed on an electronic display controlled by the control module 134. The control module 134 also allows for manually modifying of the generated collection routes. For example, discarded routes and associated collection sites can be displayed to an operator using the electronic display, and the operator may decide to add one of the discarded routes back to the routes to be dispatched, or conversely discard a route that was accepted by the simulation module 120. Further, collection sites, such as a newly identified high-priority collection site or a collection site associated with a call lodged by a client to the collection service, may be added to a collection route, and conversely collection sites can be removed from collection routes. This allows for considering information that may not have been available to the simulation module 120 when generating the collection routes. For example, a collection vehicle may have mechanical issues that prevents a driver from completing a collection route, and said collection route may need to be removed consequently. Further, a customer may call requesting urgent collection, and an associated collection site may be added to a collection route thereby forcing collection of the collection site, even if the predicted waste accumulation for that collection site is not between the minimum and maximum thresholds. Further, any collection site can be manually flagged as requiring collection using the control module 134, forcing the simulation module 120 to add the flagged collection site to a collection route. For example, collection routes including this flagged collection site will be prioritized by the simulation module 120 when generating the collection routes. In some embodiments, the control module 134 may also allows for visualising the route completion in real time.

Figure 4:
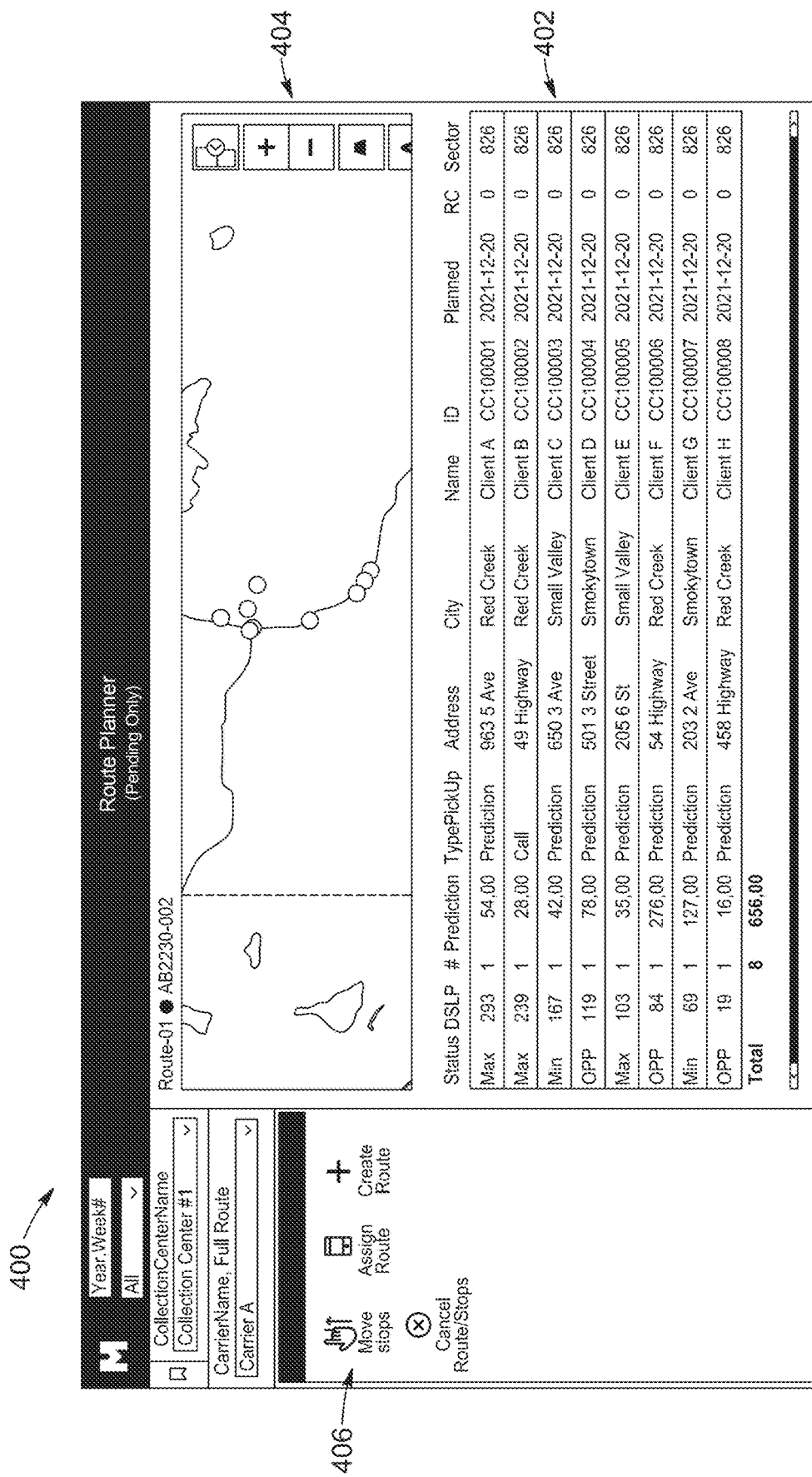
FIG. 4 shows a Route Planner panel of the control module, according to an embodiment.

FIGS. 4 and 5 show panels of the control module 134. A Route planner 400 allows for displaying and modifying a given collection route. The Route planner 400 displays a collection route along with an ordered list 402 of collection sites associated with the collection route. A map 404 displays the location of each collection site along the route. The ordered list 402 comprises all necessary information for identifying the collection sites, such as city, address, name of the company or client. Further, the ordered list 402 displays the predicted accumulation of the collection sites. The list can also contain other site-related information, such as the status of the collection site (below minimum threshold, above maximum threshold, opportunity, and so on) and indications of the reason for the collection site being added to the collection route, such as if a call was made by the client, or if the collection site was added to the route because of its prediction status. The Route planner 400 includes various interactive buttons 406 allowing for manipulating the route. As described above, the buttons 406 can include functions for adding a collection site, removing a collection site, reordering the list, removing the route, and assigning the route, for example.

A Route creation log 500 allows for visualizing all the generated collection routes. The log 500 includes a list of routes 502 generated by the system 100. The list 502 includes route-related information 504, such associated geographical region or sector name, expected driving time, predicted accumulation weight associated with the collection sites, and the number of collection sites to visit. Further, the list can include a carrier name indicating a company responsible for collection for the collection route and/or sector. The route-related information can also include an indication whether the collection route has been approved or not.

In some embodiments, the control module 134 is further configured to display real-time movement of the collection vehicles, and to allow pushing alternative collection routes, with added or removed collection sites, to user interface modules 132 of the drivers already travelling along a collection route.

Collection Route Generation Method

Figure 2:
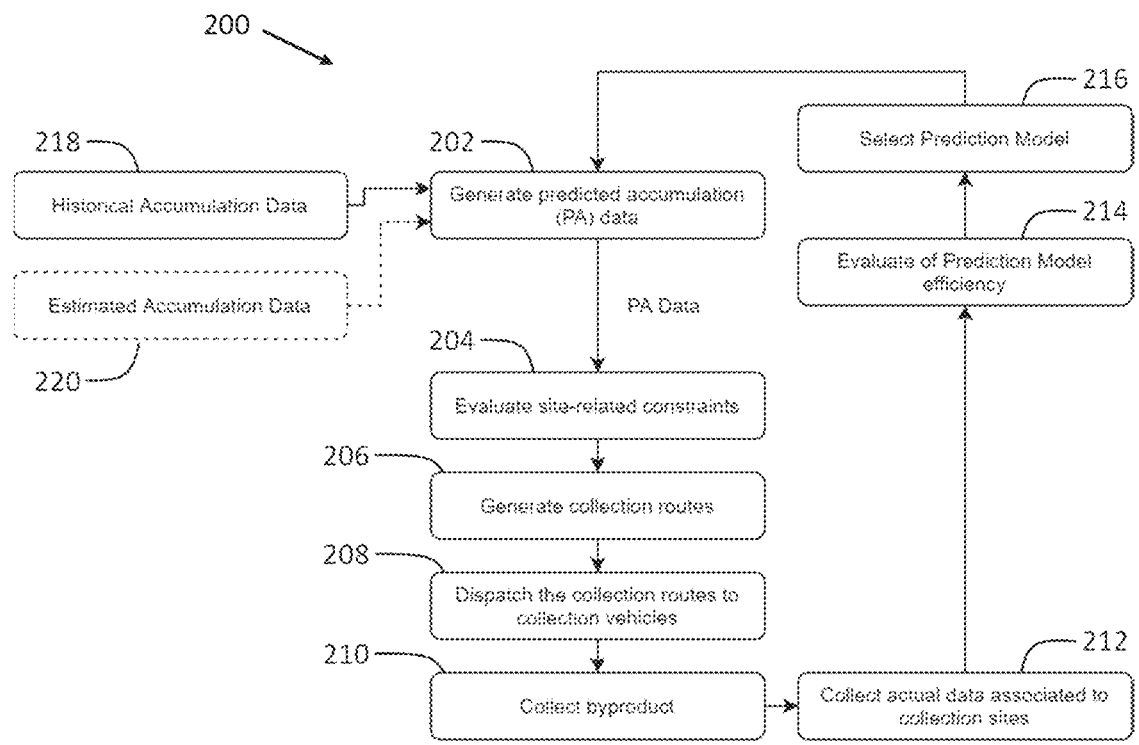
FIG. 2 is a flowchart of a method for dynamically generating collection routes based on predicted accumulation of industrial waste and recyclables, according to a possible embodiment.

A non-limiting method 200 for dynamically generating the collection routes is shown in FIG. 2. The method 200 comprises a step 202 of generating the predicted waste accumulation for each collection site. Either historical accumulation data 218 associated with each collection site or estimated accumulation data 220 can be used for predicting waste accumulation. Predicting accumulation data can be performed anytime new historical accumulation data 218 becomes available. Step 204 includes evaluating site-related constraints for each of the collection sites by comparing their predicted accumulation data with their minimum and maximum thresholds. The minimum and maximum thresholds can be either received using the control module, or automatically calculated. When the predicted accumulation data is between the minimum and the maximum thresholds, the collection site is added to a list of collection sites to be visited. At step 206, the collection routes are generated using the list of collection sites. The collection routes generated are then dispatched to collection vehicles at step 208, using for example the electronic devices associated with the vehicles. Step 210 comprises collecting the waste and/or recyclables accumulated at each of the collection sites along the collection routes. At each of those collection sites, actual accumulation data, along with potential additional data, is gathered by the drivers using the electronic devices at step 212. For example, a number of collected bags, or units, can be determined by the driver at each of the collection sites. Upon completing a route, the total weight of the waste collected along the route by the collection vehicle is measured. By calculating an average weight per unit, the actual accumulation of each site be determined. The actual accumulation data can subsequently be used by the method as historical accumulation data 218. In preferred embodiments, the method also comprises a step 214 of validating the prediction models used for predicting accumulation at the collection sites. As described herein, the accuracy of the model can be evaluated by comparing predicted accumulation data with actual (or historical) accumulation data. In some case, if the accuracy falls outside of a desired range, the prediction model is changed at step 216.

The system and methods described herein allow for predicting waste accumulation rates at collection sites and constructing collection routes based on the predicted accumulation rates and/or profitability of visiting the collection routes, and further the profitability of a whole collection route. The system allows for dispatching a collection vehicle to a collection site when necessary, instead of potential wasting resources on collecting almost empty collection sites. The system uses discrete simulation once the collection routes are created, which allows for precisely evaluating the performance of the collection routes, such as time for completing the routes. The system does not require any particular installation at the collection sites, and instead relies on machine-learning for learning waste accumulation behavior.

While the above description provides exemplary embodiments, it will be appreciated that some features and/or functions of the described embodiments are susceptible to modification without departing from the principles of the operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for generating industrial waste collection routes including collection sites to be visited by collection vehicles, the system comprising:
    one or more servers comprising processors and storage memory storing:

a prediction module having at least one predictive model configured to predict waste accumulation, at each of the collection sites, based on historical accumulation data, the predicted waste accumulation being updated as new historical accumulation data becomes available;

a simulation module operatively connected with the prediction module, configured to:

receive a minimum site-specific waste accumulation threshold and a maximum site-specific waste accumulation thresholds for each of the collection sites, wherein: the minimum site-specific waste accumulation threshold is a minimum quantity of waste that needs to be collected at the collection site for a collection visit to be profitable and the maximum site-specific waste accumulation threshold is an accumulation capacity of the collection site;

identify, from the collection sites, the ones to be visited when their predicted waste accumulation is between their minimum and maximum site-specific waste accumulation thresholds; and generate the collection routes by iteratively:
constructing simulated collection routes based on the identified collection sites;
determining whether the simulated collection routes respect route-specific thresholds;
discarding the simulated collection routes that do not respect the route-specific thresholds; and
selecting, from the remaining simulated collection routes, the collection routes which maximize collection profitability; and a user interface module configured to:
display, on electronic devices associated with the collection vehicles, the collection routes to be visited by the collection vehicles, and
receive, on the electronic devices, actual accumulation data representing accumulated waste being collected, said actual accumulation data being added to the historical accumulation data;

one or more databases storing a backend system connected to the prediction module, to the simulation module, and to the user interface module, the backend system comprising data storage, historical and actual accumulation data associated with each collection site, the generated collection routes, the minimum and maximum site-specific waste accumulation thresholds, and the route-specific thresholds, and a control module and configured to:
track, in real-time, movement of all collection vehicles;
dynamically add or remove the collection sites to be visited by the collection vehicles as the collection vehicles travel along the collection routes;
simultaneously transmit to each of the collection vehicles, updated collection routes, including the added or removed collection sites;
modify the collection routes with alternative collection routes based on the actual accumulation data received by the electronic devices of all collection vehicles during collection operations;

whereby the collection routes are traveled by the collection vehicles for collecting the industrial waste accumulated at the collection sites.

2. The system of claim 1, wherein the simulation module is further configured to construct the simulated collection routes by identifying, from the collection sites, main collection sites that correspond to large waste generators, the collection routes being constructed by first adding the identified collection sites which are neighboring the main collection sites.

3. The system of claim 1, wherein the simulation module is further configured to construct the simulated collection routes by identifying geographical regions delimited by a maximum travelling distance within the geographical regions, the one or more collection sites of a given collection route being selected from within a same geographical region.

4. The system of claim 1, wherein the simulation module is further configured to construct the simulated collection routes by identifying a type of waste associated with each of the collection sites, the collection routes being constructed using the identified collection sites having a same waste type.

5. The system of claim 1, wherein the simulation module is further configured to construct the simulated collection routes by: identifying high-priority collection sites, said high-priority collecting sites corresponding to the collection sites having their predicted waste accumulation greater than their maximum site-specific waste accumulation threshold, the collection routes being constructed by first adding the identified collection sites which are neighboring the high-priority collection sites.

6. The system of claim 1, wherein: the prediction module comprises a plurality of prediction models, and the prediction module is configured to select of one the prediction models for predicting the waste accumulation of a given collection site based on availability and/or quantity of the historical accumulation data associated with said given collection site.

7. The system of claim 1, wherein the route-specific thresholds include at least one of: a minimum quantity of waste to be collected along the collection route; waste collection capacity of the collection vehicles; route profitability; and geographical constraints.

8. The system of claim 1, wherein the prediction module is configured to predict waste accumulation at a given collection site using the historical accumulation data of other collection sites having similar characteristics when historical accumulation data of the given collection site is unavailable.

9. The system of claim 8, wherein: the simulation module is further configured to cluster the plurality of collection sites according to parameters including waste type and maximum accumulation capacity, and the prediction module is configured to predict the waste accumulation of the given collection site using the historical accumulation data of collection sites associated with a same cluster.

10. The system of claim 1, wherein: the prediction module is configured to predict the waste accumulation of a given collection site using estimated accumulation data when the historical accumulation data of the given collection site is unavailable, the estimated accumulation data being determined based on characteristics of the given collection site, the characteristics including maximum capacity and waste type.

11. The system of claim 1, further comprising an automated trigger module configured to automatically determine the minimum site-specific waste accumulation threshold, and the maximum site-specific waste accumulation threshold based on at least one of collection site characteristics and customer satisfaction objectives.

12. The system of claim 1, wherein the actual accumulation data includes at least one of: waste weight; waste volume; and a number of waste bags and/or containers.

13. The system of claim 1, wherein the prediction model is changed based on the accuracy of the predicted accumulation data, the accuracy being determined based on a comparison between the predicted accumulation data and actual accumulation data.

14. The system of claim 1, further comprising wherein the control module configured to display the generated collection routes and receive input to modify the generated collection routes, modifying the generated collection routes including at least manually creating an additional collection route, manually adding an additional collection site to a generated collection route, and adding a discarded collection route.

15. A method for generating industrial waste collection routes including collection sites to be visited by collection vehicles, the method comprising steps of:
- predicting, using one or more processors, waste accumulation, at each of the collection sites, based on historical accumulation data, the predicted waste accumulation being updated as new historical accumulation data becomes available;
- receiving, by the one or more processors, a minimum site-specific waste accumulation threshold and a maximum site-specific waste accumulation thresholds for each of the collection sites, wherein: the minimum site-specific waste accumulation threshold is a minimum quantity of waste that needs to be collected at the collection site for a collection visit to be profitable and the maximum site-specific waste accumulation threshold is an accumulation capacity of the collection site;
- identifying, using the one or more processors, from the collection sites, the ones to be visited when their predicted waste accumulation is between their minimum and maximum site-specific waste accumulation thresholds; and
- generating, using the one or more processors, the collection routes by iteratively:
  - constructing simulated collection routes based on the identified collection sites;
  - determining whether the simulated collection routes respect route-specific thresholds;
  - discarding the simulated collection routes that do not respect the route-specific thresholds;
  - selecting, from the remaining simulated collection routes, the collection routes which maximize collection profitability;
  - displaying, on electronic devices of the collection vehicles, the collection routes to be visited, and receiving, by the electronic devices, input data including actual accumulation data representing accumulated waste being collected, said actual accumulation data being added to the historical accumulation data;
- tracking, by a control module, real-time movement of all collection vehicles;
- dynamically adding or removing, by the control module, the collection sites to be visited by the collection vehicles as they travel along the collection routes;
- simultaneously transmitting, by the control module, to each of the collection vehicles, updated collection routes including the added or removed collection sites,
- modifying, by the control module, the collection routes with alternative collection routes based on the actual accumulation data received by the electronic devices of all collection vehicles during collection operations, the collecting vehicles travelling along the alternative collection routes, and
- collecting, using the collection vehicles, the accumulated waste at the collection sites included in the collection routes.

16. The method of claim 15, wherein constructing the simulated collection routes comprises identifying, from the collection sites, main collection sites that correspond to large waste generators, and first adding the identified collection sites which are neighboring the main collection sites.

17. The method of claim 15, wherein constructing the simulated collection route further comprises identifying geographical regions delimited by a maximum travelling distance within the geographical regions, the one or more collection sites of a given collection route being selected from within a same geographical region.

18. The method of claim 15, wherein constructing the simulated collection route further comprises identifying high-priority collection sites, said high-priority collecting sites corresponding to the collection sites having their predicted waste accumulation greater than their maximum site-specific waste accumulation threshold, the collection routes being constructed by first adding the identified collection sites which are neighboring the high-priority collection sites.

19. The method of claim 15, wherein the route-specific thresholds include at least one of: a minimum quantity of waste to be collected along the collection route; waste collection capacity of the collection vehicles; route profitability; and geographical constraints.

20. The method of claim 15, wherein predicting the waste accumulation at a given collection site includes using the historical accumulation data of other collection sites having similar characteristics when historical accumulation data of the given collection site is unavailable.

21. The method of claim 20, further comprising a step of clustering the plurality of collection sites according to parameters including waste type and maximum accumulation capacity and wherein predicting the waste accumulation of the given collection site includes using the historical accumulation data of collection sites associated with a same cluster.

22. The method of claim 15, wherein predicting the waste accumulation of a given collection site includes using estimated accumulation data when the historical accumulation data of the given collection site is unavailable, the estimated accumulation data being determined based on characteristics of the given collection site, the characteristics including maximum capacity and waste type.

23. The method of claim 15, further comprising a step of automatically determining the minimum site-specific waste accumulation threshold and the maximum site-specific waste accumulation threshold based on at least one of collection site characteristics and customer satisfaction objectives.

24. The method of claim 15, further comprising a step of loading the collecting the collection bags in the collection vehicle without physical contact between a vehicle driver and the collection bags.

25. The method of claim 15, further comprising: reordering, via one or more of the electronic devices of the collection vehicles, collection sites to be visited, and sending a reordered list of collection sites to the control module, wherein the collection routes are further modified based on the reordered list of collection sites received from the electronic devices.

26. The method of claim 15, further comprising measuring, using a scale, the waste quantity of the collection vehicles upon return from the collection routes, the waste quantity being entered into the user interface module as input data to indicate route-related data as part of the actual accumulation data of the completed collection routes, to be used as new historical accumulation data for predicting the waste accumulation at each collection site.

27. The method of claim 26, wherein measuring the waste quantity of the collection vehicles comprises weighting the collection vehicles upon completing their collection routes, subtracting a tare weight of the vehicles to obtain the weight of collected waste, which is used in the determination of the actual accumulation data.

28. The system of claim 1, further comprising a scale for measuring the waste quantity of the collection vehicles upon return from the collection routes, the waste quantity being entered into the user interface module to indicate route-related data as part of the actual accumulation data of the completed collection routes, used as new historical accumulation data by the prediction module.

29. The system of claim 1, further comprising a fleet of collection vehicles, each of the collection vehicles being provided with one of the electronic devices on which the user interface is displayed, the collection vehicles travelling the collection routes determined by the simulation module and updated by the control module for collecting the industrial waste accumulated at the collection sites.

* * * * *